M. NAKAMURA.
EGG BEATER.
APPLICATION FILED JULY 7, 1919.
1,368,180.
Patented Feb. 8, 1921.
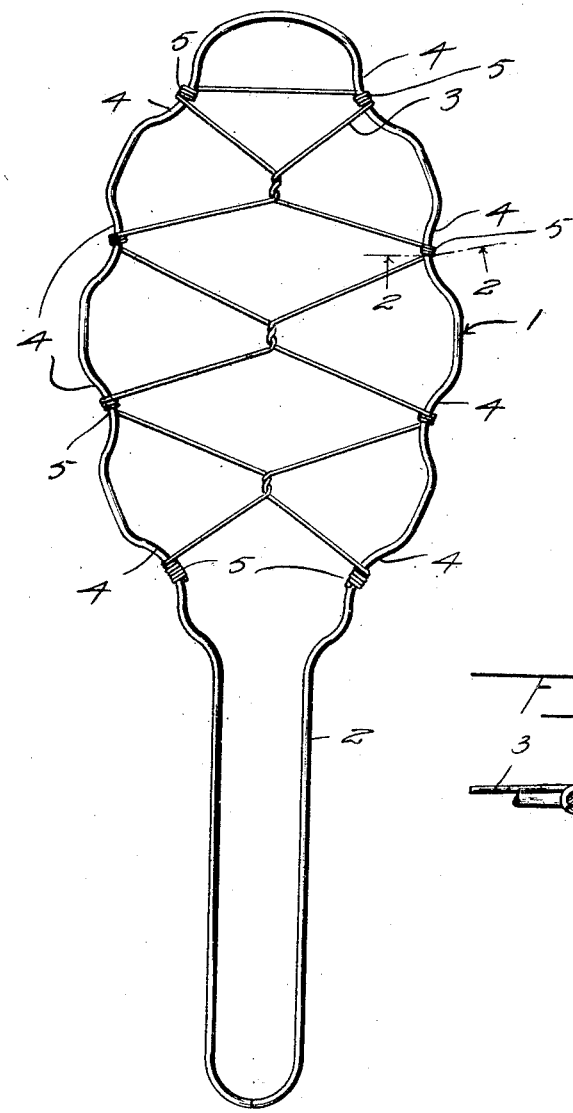
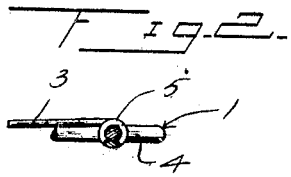
Inventor
M. Nakamura

UNITED STATES PATENT OFFICE.

MITSUTARO NAKAMURA, OF SAN FRANCISCO, CALIFORNIA.

EGG-BEATER.

1,368,180.     Specification of Letters Patent.     Patented Feb. 8, 1921.

Application filed July 7, 1919. Serial No. 308,971.

*To all whom it may concern:*

Be it known that I, MITSUTARO NAKAMURA, a subject of the Emperor of Japan, residing at San Francisco, in the county of San Francisco and State of California, have invented certain new and useful Improvements in Egg-Beaters; and I do hereby declare the following to be a full, clear, and exact description of the invention, such as will enable others skilled in the art to which it appertains to make and use the same.

This invention relates to new and useful improvements in egg beaters and has for one of its objects the provision of the body with offsets at intervals and having the bridging or connecting wire secured thereto at such points so that the wire will be protected or prevented from wearing by coming in contact with the receptacle containing the ingredients being beaten or whipped and which offsets prevent the wires from shifting or sliding on the body.

Another object of this invention is the provision of an egg beater of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which:—

Figure 1 is a plan view of an egg beater constructed in accordance with my invention.

Fig. 2 is a detail sectional view taken on the line 2—2 of Fig. 1.

Referring in detail to the drawing, the numeral 1 indicates the body of an egg beater having associated therewith the handle 2 which may be an integral portion of the body or may be separate if so desired. The body 1 is of any desired shape and is closed by connecting or bridging wires 3 which wires are interlaced with each other and connected to the body. At spaced intervals the body 1 is offset inwardly as shown at 4 and which portions have the connecting or bridging wires twisted thereabout as shown at 5 so that said bridging or connecting wires at their point of connection with the body are disposed in a plane inwardly of some portions of said body so that they will be protected and prevented from coming in contact with a receptacle containing the ingredients being beaten or whipped with the beater. The connecting or bridging wires 3 being wound about the offset portions 4 prevent the wires 3 from slipping or shifting on the body. Further by offsetting the body at various intervals increases the whipping or beating action of the device.

The body is constructed from a single length of heavy gage wire containing considerable flexibility and the handle is formed by extending the ends of the wire in spaced relation so that they may be manually squeezed to contract the frame and the contraction of the latter is adapted to bulge the panel or bridging wires outwardly of said frame and thereby increase the efficiency of the device as an egg beater.

While I have shown and described the preferred embodiment of my invention, it will be understood that minor changes in construction, combination, and arrangement of parts, may be made without departing from the spirit and scope of the invention as claimed.

Having thus described my invention, what I claim is:—

1. An egg beater comprising a handle, an open frame carried by the handle and having its sides provided with a plurality of inwardly offset anchoring portions, and a wire mesh handle extending across the frame and having attaching coils embracing said anchoring portions, the inward offset of said anchoring portions preventing said attaching coils from having any movement in a direction longitudinaly of the frame and preventing said coils from contacting with a receptacle during the use of the beater and as a result wearing away and freeing the panel.

2. An egg beater comprising a flexible open frame, a wire mesh panel secured to and extending across the frame, spaced flexible members formed on the sides of the frame to provide a handle adapted to be manually squeezed to contract the frame, the contraction of said frame adapted to bulge the panel outwardly of said frame.

In testimony whereof I affix my signature in presence of two witnesses.

MITSUTARO NAKAMURA.

Witnesses:
T. OKAWARA,
A. J. HENRY.